(12) United States Patent
Sablayrolles et al.

(10) Patent No.: US 9,857,571 B2
(45) Date of Patent: Jan. 2, 2018

(54) THERMOPLASTIC SHEET FOR A HEADS-UP DISPLAY SYSTEM

(71) Applicant: SEKISUI CHEMICAL CO., LTD., Osaka, Osaka (JP)

(72) Inventors: Jean Sablayrolles, Survilliers (FR); Frederic Clabau, Paris (FR); Michael Labrot, Aachen (DE)

(73) Assignee: SEKISUI CHEMICAL CO., LTD., Osaka (JP)

( * ) Notice: Subject to any disclaimer, the term of this patent is extended or adjusted under 35 U.S.C. 154(b) by 228 days.

(21) Appl. No.: 14/378,280

(22) PCT Filed: Feb. 22, 2013

(86) PCT No.: PCT/FR2013/050369
§ 371 (c)(1),
(2) Date: Aug. 12, 2014

(87) PCT Pub. No.: WO2013/124596
PCT Pub. Date: Aug. 29, 2013

(65) Prior Publication Data
US 2015/0002929 A1 Jan. 1, 2015

(30) Foreign Application Priority Data
Feb. 24, 2012 (FR) ...................... 12 51718

(51) Int. Cl.
*G02B 13/14* (2006.01)
*B32B 17/10* (2006.01)
*C08K 5/00* (2006.01)
*G02B 27/01* (2006.01)

(52) U.S. Cl.
CPC ...... *G02B 13/143* (2013.01); *B32B 17/10036* (2013.01); *B32B 17/10678* (2013.01); *B32B 17/10761* (2013.01); *C08K 5/005* (2013.01); *C08K 5/0008* (2013.01); *G02B 27/01* (2013.01); *G02B 27/0101* (2013.01); *G02B 2027/0118* (2013.01); *G02B 2027/0194* (2013.01)

(58) Field of Classification Search
CPC .............. G02B 13/143; G02B 27/0101; G02B 2027/0118; G02B 27/01; C08K 5/005; C08K 5/0008; B32B 17/10678; B32B 17/10036; B32B 17/10761; C08L 29/14
USPC ........................................ 428/500; 359/361
See application file for complete search history.

(56) References Cited

U.S. PATENT DOCUMENTS

| 5,013,134 A | 5/1991 | Smith |
| 5,618,863 A | 4/1997 | D'Errico et al. |
| 6,979,499 B2 | 12/2005 | Walck et al. |
| 9,166,275 B2* | 10/2015 | Altes .................... H01Q 1/1214 |
| 9,314,998 B2* | 4/2016 | Labrot ................... B32B 17/10 |
| 2004/0232826 A1 | 11/2004 | Liu et al. |
| 2005/0231652 A1 | 10/2005 | Liu et al. |
| 2006/0183833 A1 | 8/2006 | Wong et al. |
| 2008/0233279 A1* | 9/2008 | Smith .................... B32B 17/10 427/145 |
| 2011/0073773 A1* | 3/2011 | Labrot ................... B32B 17/10 250/461.1 |
| 2012/0052310 A1 | 3/2012 | Keller et al. |
| 2012/0068083 A1* | 3/2012 | Labrot ................... B32B 17/10 250/461.1 |
| 2012/0287395 A1 | 11/2012 | Tamura et al. |
| 2012/0299328 A1 | 11/2012 | Labrot et al. |
| 2013/0252001 A1* | 9/2013 | Sablayrolles ..... B32B 17/10669 428/437 |
| 2016/0011414 A1* | 1/2016 | Joseph .................... G02B 1/10 359/609 |

FOREIGN PATENT DOCUMENTS

| DE | 10 2009 044 181 A1 | 4/2011 |
| EP | 0 396 349 | 11/1990 |
| EP | 0 517 114 | 12/1992 |
| JP | 2-293356 A | 12/1990 |
| JP | 8-142276 A | 6/1996 |
| JP | 2000-507302 A | 6/2000 |
| JP | 2002-516201 A | 6/2002 |
| JP | 2005-520027 A | 7/2005 |
| JP | 2012-46748 A1 | 3/2012 |
| WO | WO 99/61243 | 12/1999 |
| WO | WO-2006/009211 A1 | 1/2006 |
| WO | WO 2010/139889 | 12/2010 |
| WO | WO-2011/105211 A1 | 9/2011 |

OTHER PUBLICATIONS

International Search Report issued for International Application No. PCT/FR2013/050369, dated Apr. 22, 2013.
Notification of Reasons for Refusal for the Application No. 2014-558189 from Japan Patent Office dated Jan. 12, 2017.
European Office Action for the Application No. 13 710 507.8 dated Mar. 31, 2017.

* cited by examiner

*Primary Examiner* — Douglas M C Ginty
(74) *Attorney, Agent, or Firm* — Cheng Law Group, PLLC

(57) ABSTRACT

A thermoplastic sheet for the manufacture of a transparent motor vehicle or building glazing intended for the display of information, in particular of a laminated glazing, the sheet including a compound exhibiting an absorption band in the ultraviolet region and of which the diffuse reflection spectrum as a function of the energy of the incident radiation is characterized by a V value on the reflection curve, determined by the point of intersection between the tangent (1) at the inflection point of said curve and its asymptote (2) at the higher energies, of between 3.06 and 3.65 eV.

17 Claims, 3 Drawing Sheets

THERMOPLASTIC SHEET FOR A HEADS-UP DISPLAY SYSTEM

CROSS-REFERENCE TO RELATED APPLICATIONS

This application is the U.S. National Stage of PCT/FR2013/050369, filed Feb. 22, 2013, which in turn claims priority to French Application No. 1251718, filed Feb. 24, 2012. The contents of all of these applications are incorporated herein by reference in their entirety.

The present invention relates to the field of display systems using transparent screens, in particular motor vehicle windshields or glazings for buildings.

Very particularly, even if it is not limited thereto, the present invention relates to the field of Head-Up Display or HUD systems. Such systems are of use in particular in aircraft cockpits or trains but also today in motor vehicles of private individuals (cars, trucks, and the like). These systems make it possible in particular to inform the driver of the vehicle without the latter looking away from the field of view in front of the vehicle, which makes possible a great increase in safety. According to another possible embodiment, the glazings according to the invention can also be used as transparent or translucent windows which make possible the display of information.

In conventional HUD systems, information is projected onto a not-completely transparent glazing, this information being reflected toward the driver or the observer. The driver perceives a virtual image which is located at a certain distance behind the windshield.

In the most conventional way, such an image is obtained by projecting information onto a windshield having a laminated structure, that is to say formed of two glass sheets and of a plastic insert generally comprising or consisting of polyvinyl butyral (PVB). However, the driver then observes a double image: a first image reflected by the surface of the windshield directed toward the inside of the compartment and a second image reflected by the external surface of the windshield, these two images being slightly offset with respect to one another. This offsetting can interfere with the viewing of the information. In order to overcome this problem, mention may be made of the solution provided in the U.S. Pat. No. 5,013,134, in which a description is given of a head-up display system using a laminated windshield formed of two glass sheets and of a polyvinyl butyral (PVB) insert, the two external faces of which are not parallel but in the form of a wedge, so that the image projected by a display source and reflected by the face of the windshield directed toward the compartment is virtually superimposed on the image originating from the same source and reflected by the face of the windshield directed toward the outside. In order to suppress the double image, a wedge-shaped laminated glazing is conventionally produced by using an inserted sheet, the thickness of which decreases from the upper edge of the glazing toward the lower edge. However, it is necessary for the profile of the PVB to be very even and not to exhibit variations in thickness as these variations are transmitted during the assembling on the windshield and result in local variations in angle.

Alternatively, provision is made, in the U.S. Pat. No. 6,979,499 B2, to send an electromagnetic beam of appropriate wavelength, in particular in the near UV region, indeed even in the visible region, onto the luminophores directly incorporated in the glazing and which are capable of responding to the excitation by the emission of light radiation in the visible region. In this way, a real and no longer virtual image is formed directly on the windshield. In addition, this image is viewable by all the passengers of the vehicle. The U.S. Pat. No. 6,979,499 B2 describes in particular a laminated glazing with an inserted sheet of the polyvinyl butyral (PVB) type, the two external faces of which are parallel, and in which luminophores are incorporated. The luminophores are chosen as a function of the wavelength of the incident excitation radiation. This wavelength can be in the ultraviolet region, in particular between 300 and 400 nm. The luminophores, under this incident radiation, emit radiation in the visible region. Such construction makes it possible, according to this document, to directly restore, on the windshield or the glazing, an image of any object. According to this disclosure, the luminophore products are deposited on the whole of a main surface of one of the sheets making up the laminated glazing (PVB or glass) in the form of a continuous layer. The desired image is obtained by the selective excitation of a predetermined area of the luminophore layer. The localization of the image and its shape are obtained by means of an excitation source controlled and modulated by external means.

In order for the information generated to be sufficiently bright, it is often necessary to use excitatory sources which generate a concentrated light, such as laser diodes. The term "concentrated" is understood to mean, within the meaning of the present description, that the power per unit area, at the level of the glazing, of the beam resulting from the generating source is greater than 120 mW·cm$^{-2}$ and preferably between 200 mW·cm$^{-2}$ and 20 000 mW·cm$^{-2}$, indeed even between 500 mW·cm$^{-2}$ and 10 000 mW·cm$^{-2}$. However, the use of such sources presents dangers related to the power and to the wavelength of the beam, in particular outside the vehicle. In particular, on working with an excitation beam which generates a high concentration of radiation in the UV region, it is necessary for the glazing to strongly absorb the UV radiation in order to prevent said radiation from escaping toward the outside.

Another essential problem related to the use of concentrated sources relates to the luminophore used, which must not deteriorate under the external UV radiation or under the concentrated incident radiation, this being in order to provide the display function with a suitable lifetime.

The imperatives of brightness and transparency direct toward a solution in which the luminophores are preferably organic. This is because the experiments carried out by the applicant company show that inorganic luminophore particles result either in an excessively high light scattering (if their size is too great) or in poor luminescence efficiencies (if their size is too small).

According to an aspect to be taken into consideration, more particularly in the case of use of the glazing in the motor vehicle field, it is known that the UV rays present in solar radiation can bring about the rapid decomposition of the plastics used in the compartment (dashboard, doors, and the like), indeed even slightly of the PVB. In order to overcome this phenomenon, it is standard to incorporate, in the plastic, generally PVB, organic compounds which absorb both the UV-A (radiation with a wavelength of between 280 and 320 nm) and the UV-B rays (radiation with a wavelength of between 320 and 400 nm) of the incident solar radiation. The molecules inserted are generally molecules of the family of the benzotriazoles. Such products are currently sold under the references Tinuvin 326® or Tinuvin 328® or also Songsorb 3280®.

The problem posed by the presence of these "anti-UV" compounds is the competition which they may occasion with the luminophores in the absorption of the concentrated excitation radiation. This is because, if the excitation source is chosen in or very close to the UV region, the luminophores and the anti-UV compounds will both absorb this incident radiation. This has the consequence of depriving the luminophores of a portion of their excitation source and thus of lowering the final brightness measured on the glazing. In particular, the inventors have been able to find that glazings in which the thermoplastic sheet was devoid of such anti-UV molecules exhibited significantly greater brightnesses.

However, it is noted that, for the reasons of protection of the PVB and of the hard plastics explained above, the complete elimination of these anti-UV compounds cannot be envisaged, in particular in applications of the windshield type.

The object of the present invention is thus to provide a solution to the problems set out above. In particular, the object of the present invention is to provide a glazing incorporating an inserted thermoplastic sheet capable of absorbing virtually all the UV-A rays and UV-B rays of the solar radiation and the brightness of which under electromagnetic excitation, when the latter is in the near UV region or even the visible region, is sufficient to make possible the visualization of information:

by the driver of the vehicle, if the glazing is used as windshield, or
  by an external observer, if the glazing is used in particular as window, in particular in diurnal viewing.

Such a result could be obtained according to the invention by an appropriate selection of the various elements constituting the glazing according to the invention.

More specifically, the present invention relates, according to a first aspect, to a sheet for the manufacture of a transparent motor vehicle or building glazing intended for the display of information, in particular of a laminated glazing, said sheet being composed of a thermoplastic material comprising a compound and exhibiting an absorption band in the ultraviolet region. The diffuse reflection spectrum of said compound, as measured as a function of the energy of incident radiation varying, for example, between 2 and 4.5 eV, is characterized by a V value on the reflection curve, determined by the point of intersection between the tangent at the inflection point of said curve and its asymptote at the higher energies, this V value being between 3.06 and 3.65 eV.

Figure 1:
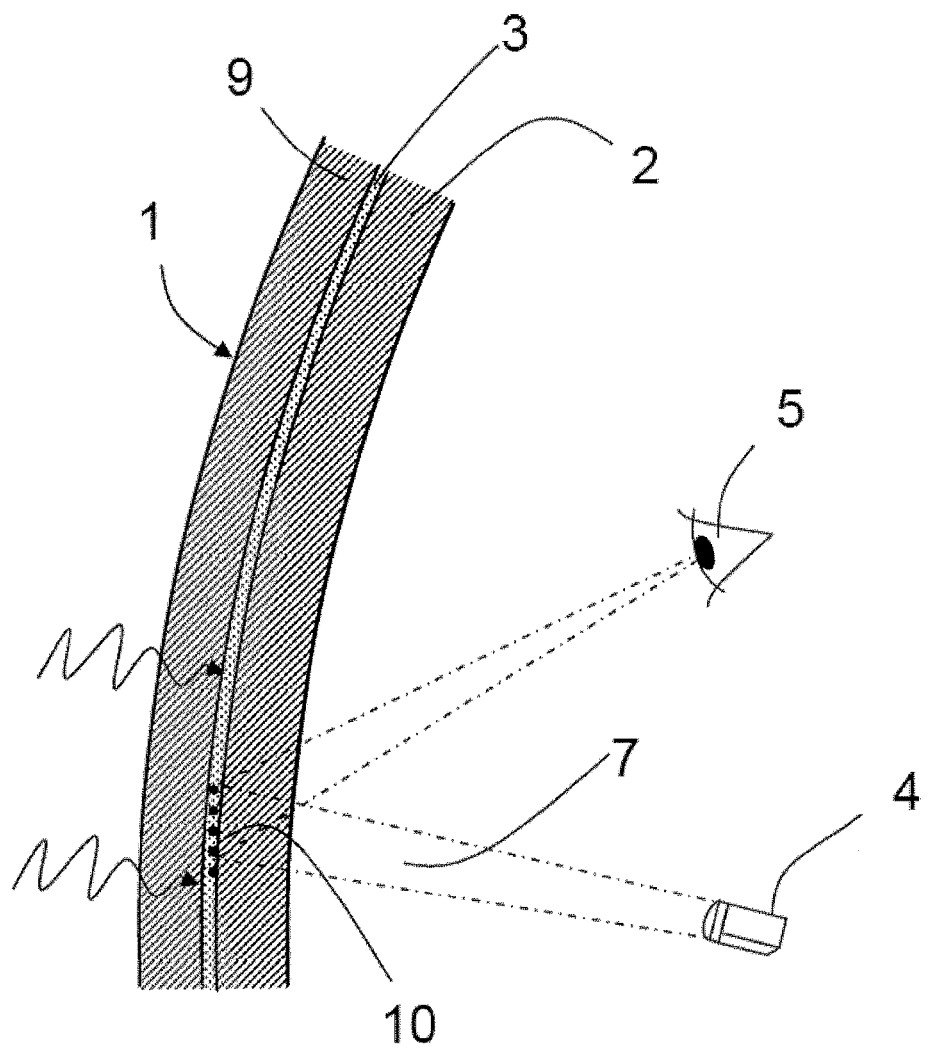
FIG. 1 is a diagram showing a windshield and a device according to the present invention.
Figure 2:
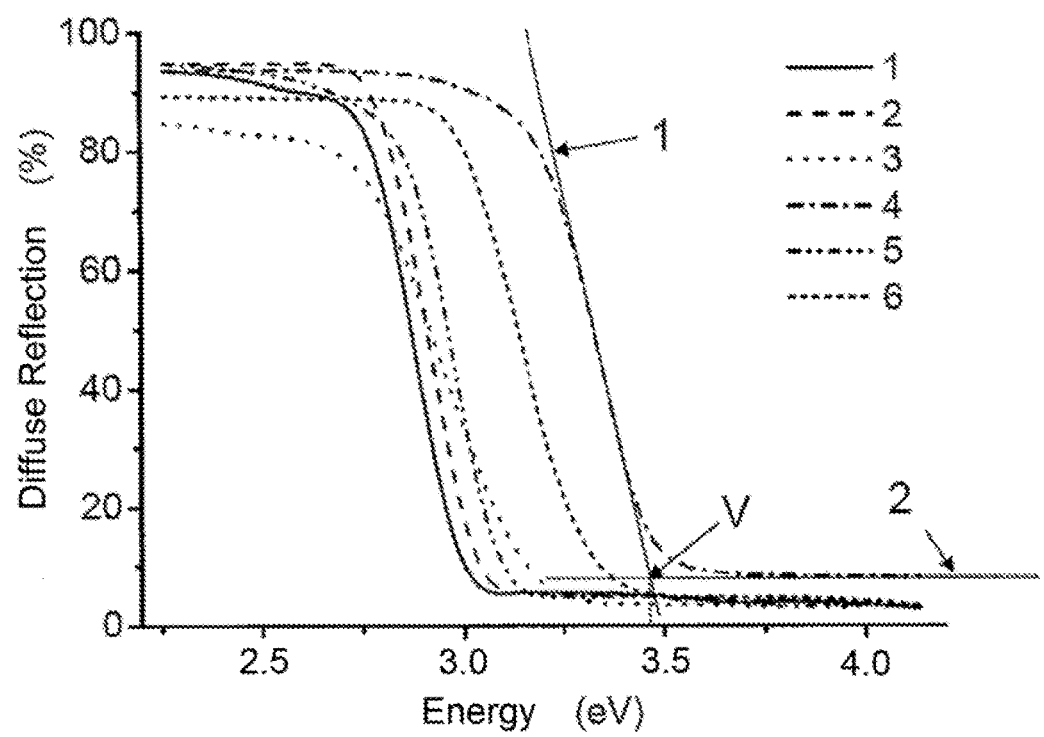
FIG. 2 is a graph showing the spectra of the sheets according to the Examples.

The term "asymptote at the higher energies", as is indicated in FIG. 2, is understood to mean the straight line tangent to the reflection curve for the energy values much greater than the V value, for example those greater than 3.75 eV, and for which the reflection reaches substantially its minimum.

According to the invention, the diffuse reflection spectrum is directly measured on the commercial powders of the compound.

According to preferred embodiments of the invention, which can very obviously be combined with one another:

The V value is between 3.14 and 3.50 eV.

The thermoplastic sheet exhibits an integrated absorbance between 310 and 340 nm of greater than 98%, preferably of greater than 99%.

The thermoplastic material is chosen from the group of PVBs, plasticized PVCs, polyurethane PU or ethylene/vinyl acetates EVAs; in particular, the plastic is a PolyVinyl Butyral (PVB).

Said compound is chosen from the group consisting of: 2-hydroxy-4-octyloxybenzophenone, N-(2-ethoxyphenyl)-N'-(2-ethylphenypethane-diamide and 2-(2H-benzotriazol-2-yl)-p-cresol.

The thickness of the thermoplastic sheet is between 300 and 1600 micrometers and is preferably between 300 and 800 micrometers.

The invention relates in particular to a sheet as described above and additionally comprising a luminophore material incorporated in said sheet, said luminophore absorbing incident excitation radiation emitted between 300 and 420 nm and releasing, after said excitation, radiation in the visible region.

Preferably said luminophore is a hydroxyterephthalate, in particular an alkyl hydroxyterephthalate ROOC-Φ(OH)$_x$—COOR of expanded formula:

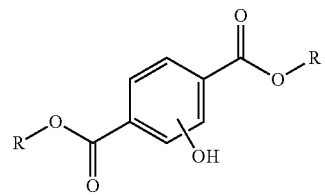

in which φ denotes a benzene ring substituted by at least one hydroxyl (OH) group, R is a hydrocarbon chain comprising from 1 to 10 carbon atoms and x is equal to 1 or 2.

According to a particularly advantageous form, said luminophore is a dialkyl 2,5-dihydroxyterephthalate corresponding to the following expanded formula:

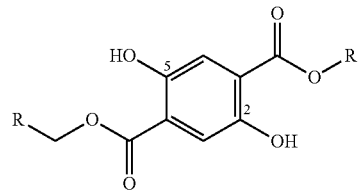

According to the invention, the thermoplastic sheet can also comprise, in addition, an H°-donating additive chosen in particular from the group consisting of phenylamines, diphenylamines and diamines.

The invention also relates to a laminated glazing for the display of information of the motor vehicle windshield type or building glazing type, comprising an assemblage of at least two transparent sheets of inorganic glass or of a resistant organic material which are connected to one another by an insert comprising at least one thermoplastic sheet as described above.

Finally, the invention relates to a device for displaying an image on a transparent glazing, comprising the above laminated glazing and a generating source of concentrated electromagnetic radiation of the laser type, the radiation of which is between 350 and 410 nm, the radiation being directed toward the region or regions of the glazing comprising the luminophore layer.

In such a display device, the generating source of electromagnetic radiation typically comprises at least one laser diode emitting excitation radiation, the wavelength of which is less than 410 nm and is preferably between 350 and 405 nm.

Preferably, the display device additionally comprises means for modulating the power of the radiation generating source, in particular in order to adjust the brightness to the lighting conditions external to the glazing, for example as a function of the conditions of exposure to sunlight of the glazing.

For example, the modulating means can define at least one power suitable for day use and at least one power which is lower than the above and which is suitable for night use.

In addition, the invention relates to a process for the manufacture of a laminated glazing according to one of the preceding implementations, according to which the luminophores are inserted into the thermoplastic sheet of the PVB type via an extrusion process or else they are deposited on the thermoplastic sheet by a solution deposition technique chosen from spray coating, screen printing, laminar-flow coating, roll-to-roll processing, inkjet coating or also the techniques of the offset, flexogravure or also photogravure type, and then the laminating of the glazing is carried out under an autoclave.

The invention and its advantages will be better understood on reading the embodiment of the invention which follows, in connection with the single appended figure.

The appended figure makes it possible to illustrate the invention and its advantages;

In this figure, a windshield and a device according to the invention have been diagrammatically represented:

The windshield 1 is composed of two sheets 2 and 9 typically made of glass but which might also be composed of resistant plastic of the polycarbonate type. Between the two sheets is present a plastic inserted sheet 3, such as PVB (polyvinyl butyral), plasticized PVC, PU or EVA, or else a multilayer thermoplastic insert incorporating, for example, PET (polyethylene terephthalate), the sequence of the layers of which is, for example, PVB/PET/PVB.

At least one of the thermoplastic sheets making up the insert 3 was, before laminating, that is to say before the assembling of the various sheets, filled or impregnated over at least one of its faces with an organic luminophore, in particular of the terephthalate type, with a compound which specifically absorbs UV rays according to the invention and optionally with a protective additive of the type which donates H° radicals.

A laser source 4 emitting excitation radiation is used to send concentrated incident radiation 7 with a wavelength close to 400 nm. The wavelength is generally adjusted so that the luminophore 10, dissolved in the molecular form in the inserted thermoplastic sheet 3, exhibits a high coefficient of absorption of the incident radiation. It subsequently reemits radiation in the visible region.

The visible radiation emitted by the luminophore is then directly observable by the eye 5 of the driver, who thus visualizes the object on the windshield without having to take the eyes off the road. In this way, an image can be directly materialized on a laminated windshield without having to adjust the structure of the latter, for example the thickness of the inserted sheet, which makes possible economical manufacture of the HUD systems.

The source used to generate the concentrated radiation is, for example but not limitingly, of the solid-state laser, semiconductor laser diode, gas laser, dye laser or excimer laser type. Generally, any known source generating a concentrated and directed flux, within the meaning of the present invention, of electromagnetic radiation can be used as excitation source according to the invention.

Figure 3:
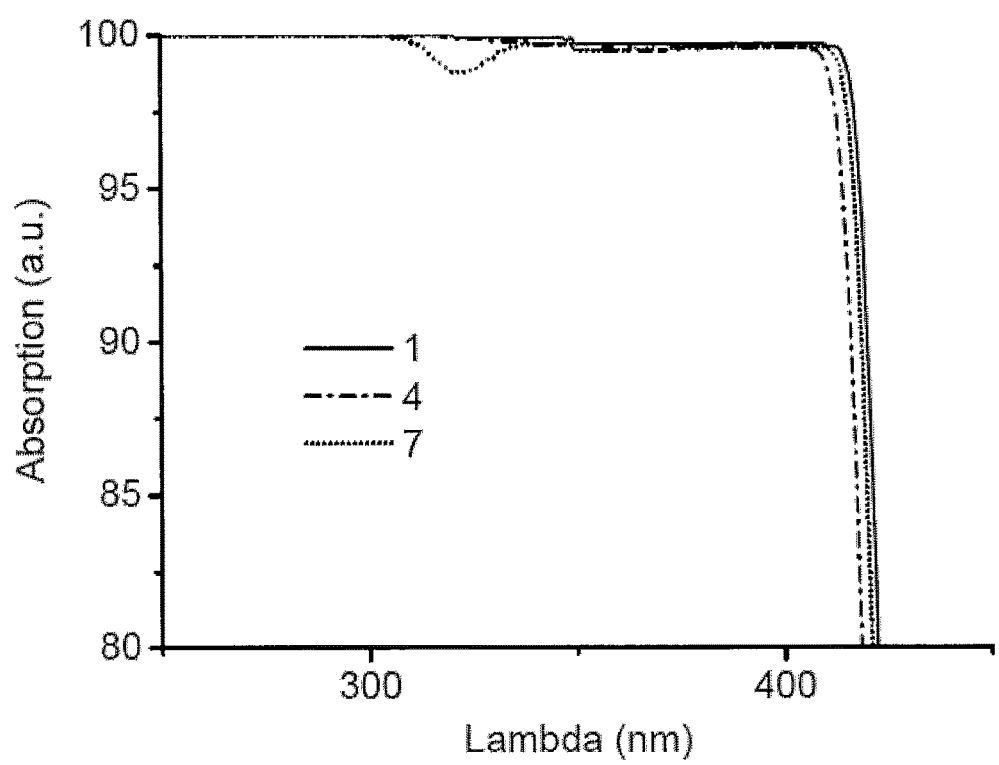
FIG. 3 is a graph showing the measurements of the UV visible absorption spectra as a function of the energy of the incident radiation.

According to one embodiment, it is possible to use a DLP projector for modulating the excitation wave according to the method described in the application US 2005/231652, section [0021]. It is also possible according to the invention to use, as excitation source, a device as described in the application US 2004/0232826, in particular as described in connection with FIG. 3.

In addition to the DLP projectors, which operate with a matrix of micromirrors, projectors using the MEMS (Micro-Electro-Mechanical Systems) technology, in particular with deflection of the incident beam (in particular laser beam) by means of a single mirror, can also be used according to the invention.

The luminophore, the compound which specifically absorbs UV rays according to the invention and, if appropriate, a protective additive of the type which donates H° radicals can be inserted into the PVB sheet during its extrusion.

According to another possible route, they can be deposited on the PVB sheet by spray coating or screen coating techniques, by techniques of the inkjet coating type or also by techniques of the offset, flexogravure or photogravure type.

It is apparent that the luminophores, the compound which specifically absorbs UV rays and the protective additive, all three of organic nature, could thus be incorporated in the PVB plastic sheet in a sufficiently intimate manner for their presence no longer to be able to be detected by conventional light microscopy techniques. Without this being able to be interpreted as any one theory, a possible explanation would be that the organic molecules added to the plastic are completely dissolved in the PVB sheet after passing through the autoclave, that is to say that they are reencountered therein at the end in the form of individual molecules in the plastic.

Certainly because of this phenomenon, it has been found by the applicant that, in the context of an application in which an image is displayed through a transparent glazing, the use of luminophores, for example of the hydroxyterephthalate type as described in the application WO 2010/139889, makes it possible to efficiently respond to the following requirements, necessary for such an application:

a) an acceptable sharpness of the image, b) a haze, brought about by the affixing of the layer to the windshield, measured according to the standard Ansi Z26.1 1996, of less than 2%, indeed even of less than 1%, c) a light transmission of greater than 70% and preferably of greater than 75%, d) satisfactory properties of durability toward incident solar UV radiation and toward excitation radiation, in particular laser radiation, e) a luminescence intensity sufficient for it to be observable by the driver, in particular in diurnal viewing.

In particular, as regards point e), the specific choice of an additional compound exhibiting the specific characteristics of absorption of the UV rays described above makes possible a substantial improvement in the brightness performance of the glazing, as illustrated by the examples below.

The preceding embodiment is, of course, in no way limiting of the present invention, under any of the aspects described above.

EXAMPLES

The examples which follow make it possible to illustrate an example of the implementation of a laminated windshield comprising the luminophore according to the invention and its advantages:

First, a laminated windshield, comprising the sequence of two glass sheets connected by an inserted PVB sheet with a thickness of 760 microns not comprising products which absorb in the UV region other than PVB, was synthesized. The assembling is carried out according to the well-known techniques of the art.

Prior to the laminating, a luminophore layer is deposited according to a square with dimensions of approximately 10×10 cm$^2$. The luminophore is diethyl 2,5-dihydroxy-terephthalate described in the application WO 2010/139889. The luminophore is deposited by a conventional screen printing technique on the internal face of the glass sheet 2, that is to say on the face turned toward the PVB sheet before the assembling stage (see figure). Without departing from the scope of the invention, the luminophore can also be deposited on the internal face of the PVB or incorporated in the PVB sheet by extrusion.

More specifically, the luminophore is diluted beforehand, as a mixture with various compounds which selectively absorb UV rays, in a solvent of the THF type comprising a binder of PVB type. The dilution is adjusted in order to finally obtain a concentration of luminophore of 0.5% and of the compound which absorbs UV rays of 0.1%, with respect to the total weight of PVB.

The mixtures are subsequently screen printed, according to conventional techniques, on the glass sheet. The thickness of the initial layer deposited by screen printing and incorporating the luminophore and the additional compound in the PVB mixture is from approximately 10 to 40 microns.

The solvent is subsequently allowed to evaporate and then the laminating is carried out with the two glass sheets and the PVB sheet according to autoclave techniques conventional in the field. A windshield as described in the figure is thus obtained.

Different glazings are thus obtained into which the various additional compounds given in table 1 below were inserted. Samples 1 and 2 represent the prior art, while samples 3 to 6 represent the invention. A comparative sample is also manufactured (example 7), in which only the luminophore is incorporated in the glazing.

The characteristic parameters of the systems were measured according to the following protocols:

The haze was measured according to the motor vehicle standard Ansi Z26.1 (1996).

The brightness of the glazings under the effect of radiation resulting from a excitation laser diode was measured according to the following method: the beam was directed directly on the portion of the glazing comprising the luminophore layer, over a surface area of approximately 2 mm$^2$. A brightness meter is directed toward the spot of light emitted and the brightness is measured continuously in cd/m$^2$.

The initial brightness of the emission radiation is measured, a brightness of the order of several hundred cd/m$^2$ being regarded as sufficient for the spot to be perfectly visible to the driver looking at the road under normal conditions of exposure to sunlight, as described above. This brightness is with respect to that measured for the glazing according to the reference example 7.

The durability toward incident solar UV radiation was measured with the Arizona® test, which consists in continuously exposing the glazing to radiation emitted by a xenon arc lamp in order to simulate solar radiation according to the standard ISO 4892 (part 2) at a temperature of 90° C. The durability is defined as the time necessary for the initial brightness to be reduced by half.

The UV/visible absorption measurements were carried out on a Hach Lange DR5000 spectrometer. The spectra of the sheets according to examples 1 (according to the prior art), 4 (according to the invention) and 7 (reference) have been given in FIG. 3. It may be seen that, in the absence of the additional compound which absorbs UV rays, a portion of the incident UV radiation is not absorbed by the sheet. On the other hand, for the sheets according to examples 1 and 4, all the incident UV radiation is absorbed by the sheet. The diffuse reflection spectra of the compounds which selectively absorb UV rays were obtained according to conventional techniques with the powders of these compounds placed in a Cary Varian 5G spectrophotometer equipped with an integrating sphere covered with Spectralon. In FIG. 2, the measurements of these UV/visible absorption spectra as a function of the energy of the incident radiation have been given. It may be seen that the V value, in which the tangents at the inflection point and at the high energies intersect, is very different as a function of the chemical nature of said compound: it is measured below 3.06 eV for samples 1 and 2 (according to the prior art) and above 3.06 eV for samples 3 to 6 (according to the invention).

TABLE 1

|  | Example | | | | | | |
| --- | --- | --- | --- | --- | --- | --- | --- |
|  | 1 | 2 | 3 | 4 | 5 | 6 | 7 (ref) |
| Compound which absorbs UV rays | Tinuvin 326 | Songsorb 3280 | UV-531 | Tinuvin 312 | Milestab P | Uvinul 3035 | None |
| V value (eV) | 2.98 | 3.03 | 3.15 | 3.47 | 3.08 | 3.30 | NA |
| Relative brightness (with respect to that of sample 7) | 0.62 | 0.9 | 1 | 1 | 1 | 1 | 1 |
| Percentage of the incident UV radiation absorbed at 327 nm | 100 | 100 | 100 | 100 | 100 | 100 | 96 |
| Durability under UV radiation (Arizona test) | >1500 h | >1500 h | >1500 h | >1500 h | >1500 h | ~1500 h | >1500 h |
| Haze (%) (Ansi Z26.1 (1996)) | <1 | <1 | <1 | <1 | <1 | <1 | <1 | with:
Tinuvin 326 ®: 2-(5-chloro-2H-benzotriazol-2-yl)-6-(1,1-dimethylethyl)-4-methyl-phenol
Songsorb 3280 ®: 2-(2'-hydroxy-3',5'-di-t-amylphenyl)benzotriazole
UV-531 ®: 2-hydroxy-4-octyloxybenzophenone
Tinuvin 312 ®: ethanediamide, N-(2-ethoxyphenyl)-N'-(2-ethylphenyl)
Milestab P ®: 2-(2H-benzotriazol-2-yl)-p-cresol
Uvinul 3035 ®: ethyl 2-cyano-3,3-diphenylacrylate.

The results given in table 1 show that the glazing according to example 7 exhibits the highest brightness value, in the absence of additional compound which absorbs UV rays. However, the data given in table 1 show that such a glazing cannot be used according to the standards currently in force, in particular in the motor vehicle field: only 96% of the UV radiation at 327 nm (3.79 eV) is absorbed by the glazing. Such a characteristic can result over time in a deterioration of the plastics, as described above.

The samples according to examples 1 and 2, which incorporate compounds absorbing UV rays conventionally used in the motor vehicle field, absorb all of the incident UV rays. However, relatively low brightnesses are observed for these glazings when they are used for the display of information.

The data given in the preceding table 1 clearly indicate that the use of compounds which selectively absorb UV rays according to the invention makes it possible to obtain, all at once, a glazing exhibiting complete protection of the compartment against UV radiation resulting from solar radiation and a high luminescence efficiency under UV excitation.

The invention claimed is:

1. A thermoplastic sheet for the manufacture of a transparent motor vehicle or building glazing intended for the display of information, said sheet comprising:
   a compound exhibiting an absorption band in the ultraviolet region, wherein a diffuse reflection spectrum as a function of the energy of the incident radiation of said compound is characterized by a V value on the reflection curve, determined by the point of intersection between the tangent (1) at the inflection point of said curve and its asymptote (2) at the higher energies, of between 3.06 and 3.65 eV, and
   a luminophore material incorporated in said sheet, said luminophore absorbing incident excitation radiation emitted between 300 and 420 nm and releasing, after said excitation, radiation in the visible region.

2. The thermoplastic sheet as claimed in claim 1, wherein the V value is between 3.14 and 3.50 eV.

3. The thermoplastic sheet as claimed in claim 1, exhibiting an integrated absorbance between 310 and 340 nm of greater than 98%.

4. The thermoplastic sheet as claimed in claim 1, wherein the thermoplastic material is selected from the group consisting of PVBs, plasticized PVCs, polyurethane PU and ethylene/vinyl acetates EVAs.

5. The thermoplastic sheet as claimed in claim 1, wherein the plastic is a PolyVinyl Butyral (PVB).

6. The thermoplastic sheet as claimed in claim 1, wherein said compound is selected from the group consisting of: 2-hydroxy-4-octyloxybenzophenone, N-(2-ethoxyphenyl)-N'-(2-ethylphenyl)ethanediamide and 2-(2H-benzotriazol-2-yl)-p-cresol.

7. The thermoplastic sheet as claimed in claim 1, with a thickness of between 300 and 1600 micrometers.

8. A thermoplastic sheet for a transparent laminated glazing, said sheet comprising:
   a compound exhibiting an absorption band in the ultraviolet region, and having a diffuse reflection spectrum as a function of the energy of the incident radiation that is characterized by a V value on a reflection curve, determined by a point of intersection between a tangent at the inflection point of said reflection curve and an asymptote of said reflection curve at higher energies, of between 3.06 and 3.65 eV, and
   a luminophore material incorporated in said sheet, said luminophore absorbing incident excitation radiation emitted between 300 and 420 nm and releasing, after said excitation, radiation in the visible region.

9. The thermoplastic sheet as claimed in claim 1, wherein said luminophore is a hydroxyterephthalate.

10. The thermoplastic sheet as claimed in claim 9, wherein said luminophore is an alkyl hydroxyterephthalate ROOC-Φ(OH)$_x$—COOR of expanded formula:

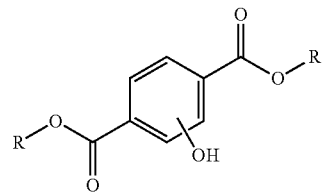

in which Φ denotes a benzene ring substituted by at least one hydroxyl (OH) group, R is a hydrocarbon chain comprising from 1 to 10 carbon atoms and x is equal to 1 or 2.

11. The thermoplastic sheet as claimed in claim 10, wherein said luminophore is a dialkyl 2,5-dihydroxyterephthalate corresponding to the expanded formula:

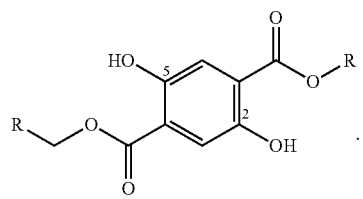

12. The thermoplastic sheet as claimed in claim 1, additionally comprising an H°-donating additive.

13. The thermoplastic sheet as claimed in claim 12, wherein the H°-donating additive is selected from the group consisting of phenylamines, diphenylamines and diamines.

14. A laminated glazing for the display of information, the laminated glazing to be used in a motor vehicle windshield or a building glazing, comprising an assemblage of at least two transparent sheets of inorganic glass or of a resistant organic material which are connected to one another by an insert comprising at least one thermoplastic sheet as claimed in claim 1.

15. A device for displaying an image on a transparent glazing, comprising a laminated glazing as claimed in claim 14 and a generating source of concentrated electromagnetic radiation of the laser type, the radiation of which is between 350 and 410 nm, the radiation being directed toward the region or regions of the glazing comprising the luminophore layer.

16. The thermoplastic sheet as claimed in claim 3, wherein the integrated absorbance is greater than 99%.

17. The thermoplastic sheet as claimed in claim 7, wherein the thickness is between 300 and 800 micrometers.

* * * * *